United States Patent
Dabak et al.

(10) Patent No.: US 9,525,977 B2
(45) Date of Patent: Dec. 20, 2016

(54) BROADCAST MULTICAST MODE

(75) Inventors: Anand G. Dabak, Plano, TX (US); Eko N. Onggosanusi, Allen, TX (US); Aris Papasakellariou, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 583 days.

(21) Appl. No.: 11/117,920

(22) Filed: Apr. 29, 2005

(65) Prior Publication Data

US 2005/0276238 A1 Dec. 15, 2005

Related U.S. Application Data

(60) Provisional application No. 60/579,957, filed on Jun. 15, 2004, provisional application No. 60/611,436, filed on Sep. 20, 2004.

(51) Int. Cl.
| | |
|---|---|
| *H04B 7/216* | (2006.01) |
| *H04W 4/06* | (2009.01) |
| *H04J 13/00* | (2011.01) |
| *H04W 72/00* | (2009.01) |
| *H04L 25/02* | (2006.01) |
| *H04L 25/03* | (2006.01) |
| *H04W 28/06* | (2009.01) |

(52) U.S. Cl.
CPC ............ *H04W 4/06* (2013.01); *H04J 13/00* (2013.01); *H04W 72/005* (2013.01); *H04B 2201/70701* (2013.01); *H04L 25/0204* (2013.01); *H04L 25/0224* (2013.01); *H04L 25/03159* (2013.01); *H04W 28/06* (2013.01)

(58) Field of Classification Search
CPC ...... H04W 4/06; H04W 28/06; H04W 72/005; H04B 2201/70701; H04J 13/00; H04L 25/0204; H04L 25/0224; H04L 25/03159

USPC ....... 370/270, 312, 320, 335, 342, 349, 389, 370/392, 474
See application file for complete search history.

(56) References Cited

U.S. PATENT DOCUMENTS

| | | | |
|---|---|---|---|
| 6,101,230 A * | 8/2000 | Chun ................. | H04L 27/2657 375/355 |
| 6,144,650 A * | 11/2000 | Watanabe et al. ............ | 370/335 |
| 6,259,729 B1 * | 7/2001 | Seki .................. | H04L 25/03133 375/231 |
| 7,301,983 B1 * | 11/2007 | Horne ........................... | 375/130 |
| 7,447,175 B2 * | 11/2008 | Shin ............................. | 370/331 |
| 2002/0044524 A1 * | 4/2002 | Laroia et al. ................ | 370/203 |
| 2003/0223393 A1 | 12/2003 | Lee | |
| 2004/0062193 A1 | 4/2004 | Ma et al. | |
| 2004/0136336 A1 * | 7/2004 | Nakamura et al. ........... | 370/328 |

(Continued)

OTHER PUBLICATIONS

Agashe, P.; Rezaiifar, R.; Bender, P.; "cdma2000 High Rate Broadcast Packet Data Air Interface Design", IEEE Comm. Magazine, Feb. 2004, pp. 83-89.

(Continued)

*Primary Examiner* — Ajit Patel
(74) *Attorney, Agent, or Firm* — Ronald O. Neerings; Charles A. Brill; Frank D. Cimino

(57) ABSTRACT

A broadcast/multicast transmission format includes a data portion and a cyclic prefix (CP) coupled to the traffic data portion. A method and system for providing broadcast/multicast transmissions with the application to communication systems that perform broadcast or multicast transmission is also disclosed. The addition of a pilot to the data portion of the transmissions is also disclosed.

3 Claims, 3 Drawing Sheets

(56) References Cited

U.S. PATENT DOCUMENTS

| | | | |
|---|---|---|---|
| 2004/0214574 A1 | 10/2004 | Eyuboglu et al. | |
| 2004/0233873 A1* | 11/2004 | Lee et al. | 370/335 |
| 2004/0246998 A1 | 12/2004 | Ma et al. | |
| 2005/0047513 A1* | 3/2005 | Vitenberg | H04L 27/0004 375/260 |
| 2005/0226140 A1* | 10/2005 | Zhuang et al. | 370/203 |
| 2009/0074098 A1* | 3/2009 | Wu et al. | 375/260 |

OTHER PUBLICATIONS

C30-20040607-060, "Enhanced Broadcast-Multicast for HRPD", Philadelphia meeting of 3GPP2, Jun. 2004.
Telecommunications Industries Association's interim standard TIA/EIA/IS-856, "cdma2000 High Rate Packet Data Air Interface Specification", Nov. 2000.

* cited by examiner

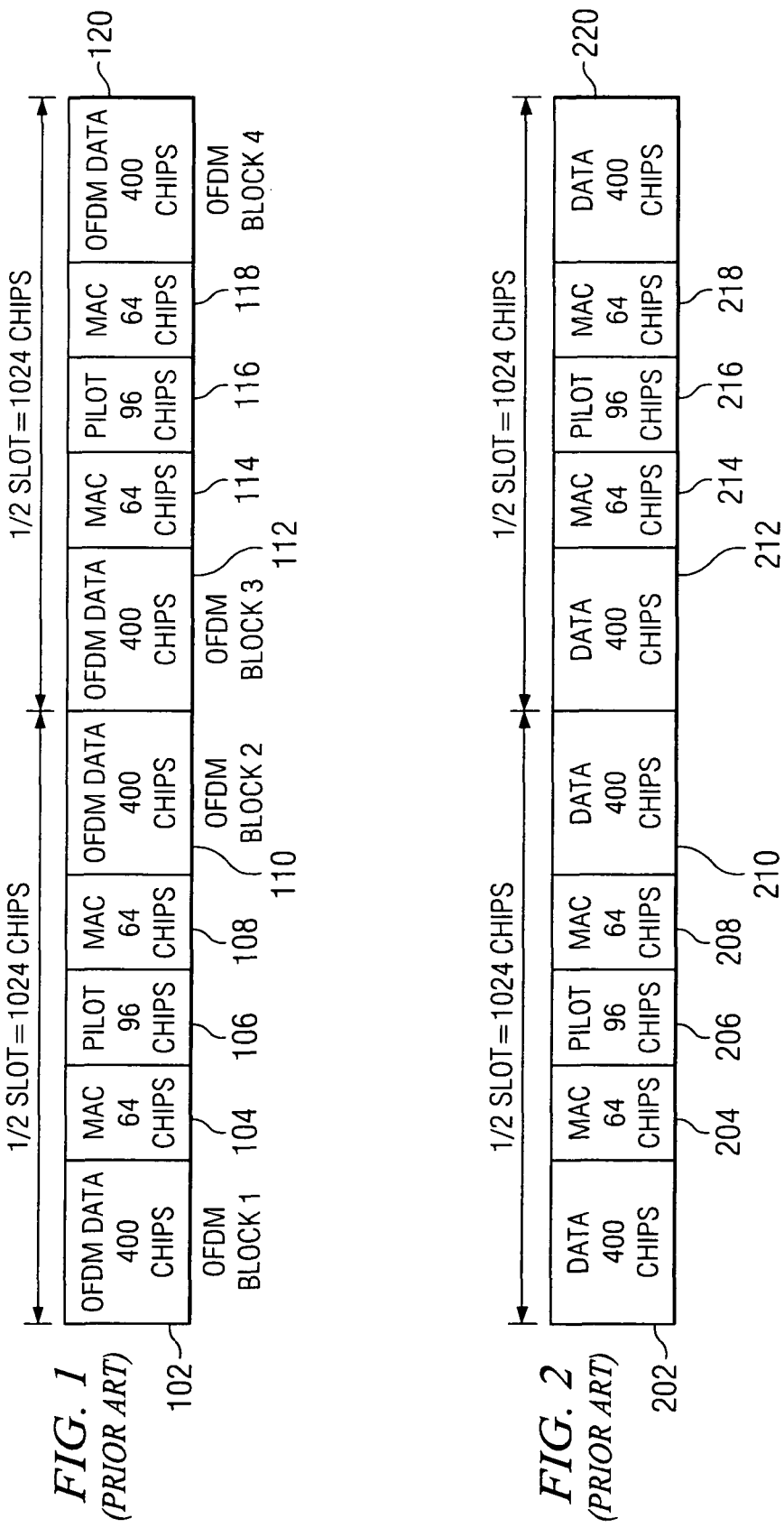

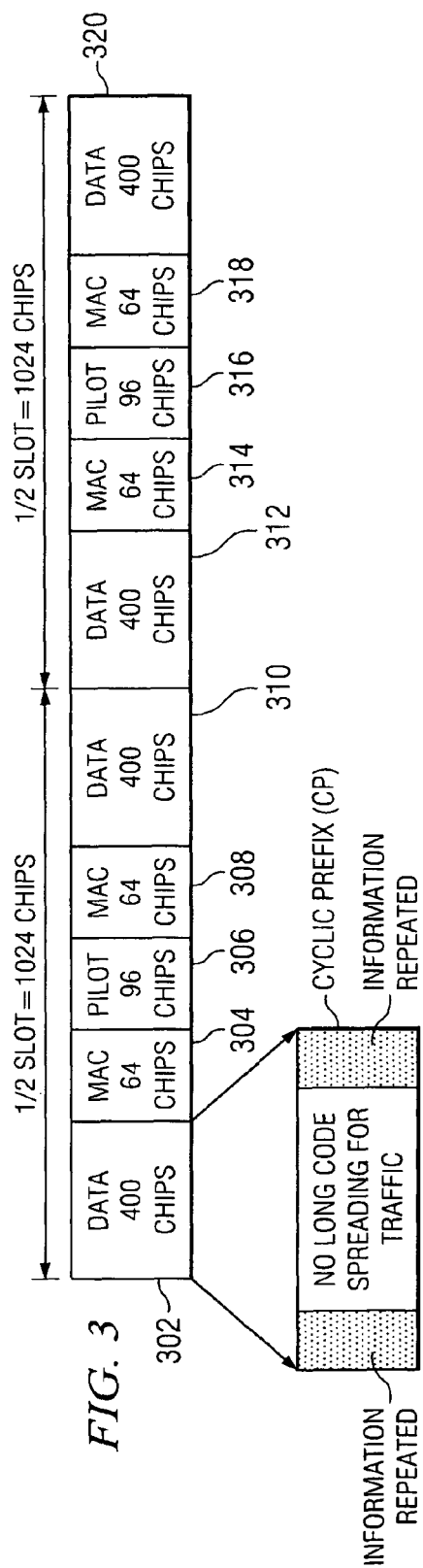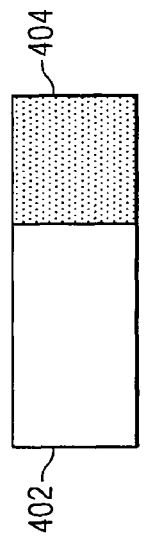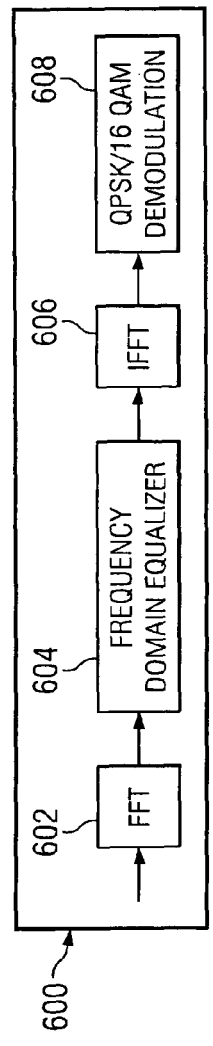

BROADCAST MULTICAST MODE

CROSS-REFERENCE TO RELATED APPLICATIONS

This application claims priority to U.S. Provisional Application No. 60/579,957 filed Jun. 15, 2004, and entitled "CDMA with CP Based Enhanced Broadcast Multi-Cast Mode for HRPD," by Anand G. Dabak et al; and to U.S. Provisional Patent Application No. 60/611,436, filed Sep. 20, 2004, entitled "A CDMA-based enhanced broadcast multi-cast system with content-dependent data and pilot spreading for HRPD," by Onggosanusi, et al; both provisional applications are incorporated by reference as if fully set forth herein.

FIELD OF THE INVENTION

This invention relates in general to the field of communications and more specifically to a broadcast/multicast mode for use in communication systems.

BACKGROUND OF THE INVENTION

High rate packet data (HRPD) is also commonly referred to as 1xEV-DO which is a high-speed code division multiple access (CDMA) based wireless data technology. A comprehensive discussion of HRPD can be found in the Telecommunications Industries Association's interim standard TIA/EIA/1S-856 entitled cdma2000 High Rate Packet Data Air Interface Specification, November 2000, which is incorporated herein by reference.

Referring now to FIG. 1, there is shown a diagram of a prior art Orthogonal Frequency Division Multiplexing (OFDM) based enhanced broadcast multicast (EBM) mode for an HRPD proposal (found in proposal entitled "Enhanced Broadcast-Multicast for HRPD", Philadelphia meeting of 3GPP2, June, 2004, C30-20040607-060). As shown in FIG. 1, the structure of the transmission format 100 employs both OFDM and Code Division Multiple Access (CDMA) transmissions. Medium Access Control (MAC) portions 104, 108, 114, 116 and pilot portions 106 and 116 are transmitted using CDMA, while OFDM data portions 102, 110 and 120 are transmitted using OFDM. One limitation of the transmission format 100 is that it is not backward compatible with the current HRPD transmission scheme 200 shown in FIG. 2. Since OFDM is not currently employed by HRPD channels, the HRPD channels are not backward compatible with the OFDM modulated portions of transmission format 100.

The broadcast/multicast data is broadcast to all system users and it is also possible the same information is also transmitted from different cells/sectors in a communication system employing the format shown in FIG. 1. In this situation, when CDMA with a long code spreading is used, the exact same signals received from the different cells/sectors cause interference with each other and they can be coherently combined with each other using for example a rake receiver. However, the transmission of HRPD requires equalizers to be implemented at the receivers and in this particular case; it is difficult to efficiently combine the same data transmitted by the different cells/sectors in the system. The combining cannot be done efficiently in one operation since data coming from different cells/sectors are modulated with different cell/sector-dependent specific spreading codes. That is, a possible combining scheme performs separate equalization on the received signal from each sector prior to combining the resulting soft decisions from all the equalizers. While this combining approach is feasible, the performance loss due to sub-optimal combining and equalization may be significant especially in high frequency selective channels.

In highly frequency selective channels (example, a Pedestrian B channel), an equalizer can be employed as a substitute to a rake receiver in order to enhance performance. In this case, equalization is performed per sector prior to soft combining across the sectors. Most equalizers require a sufficiently high signal-to-noise ratio (SNR) training to achieve good performance in order to train its equalizer taps or perform channel estimation. Unfortunately, this is not possible since the SNR for the secondary sectors is very low due to interference from the stronger (primary) sectors. Also, due to sector-dependent data and pilot spreading it is not possible to achieve a one shot equalization of the total channel summed across all the sectors.

In the case of OFDM, since the exact same information is transmitted from the different cells/sectors (without the long code), the signals received from the different cells/sectors look like multi-path propagation delay. Hence, all the different multi-paths/signals can be efficiently combined at the receiver using fast Fourier transform (FFT) prior to performing frequency-domain equalization. This approach typically uses a cyclic prefix (CP) having a length that is larger than the expected propagation delay from the different base stations in the system. Hence, a very large CP (e.g., 80 samples requiring approximately 65 microseconds) is in employed with the transmission format of FIG. 1, even though the channel spread for a single base station is expected to be much less (e.g., less than 15 microseconds in a Vehicular B channel). Some loss in spectral efficiency due to cyclic prefix insertion occurs. But this rate loss is offset with the throughput gain from the use of combining.

As shown in FIG. 2, the current transmission format for HRPD which is transmitted using CDMA includes data (traffic data) 202, a MAC, Pilot 206, MAC 208, followed by data 210, data 212, MAC 214, Pilot 216, MAC 218 and data 220. While OFDM allows a very efficient method of joint combining and equalization of the exact replica of the signal transmitted from the different base stations, it also introduces limitations, such as non-backward compatibility with the all CDMA transmission format currently used for HRPD shown in FIG. 2.

The current broadcast/multicast system (BCMS) applies sector-dependent long code spreading on the pilot and data fields which generates a few problems. One problem

BRIEF DESCRIPTION OF THE DRAWINGS

FIG. 1 is a drawing highlighting a structure of a prior art channel for an enhanced broadcast/multicast mode (EBM) for HRPD.

FIG. 2 shows a prior art diagram of a HRPD transmission format;

FIG. 3 shows a CDMA-CP based broadcast/multicast transmission format in accordance with an embodiment of the invention;

FIG. 4 shows a cyclic prefix placement in accordance with an embodiment of the invention;

FIG. 5 shows another cyclic prefix placement in accordance with another embodiment of the invention;

FIG. 6 shows a block diagram of a receiver in accordance with an embodiment of the invention;

DETAILED DESCRIPTION OF THE PREFERRED EMBODIMENTS

Figure 7:
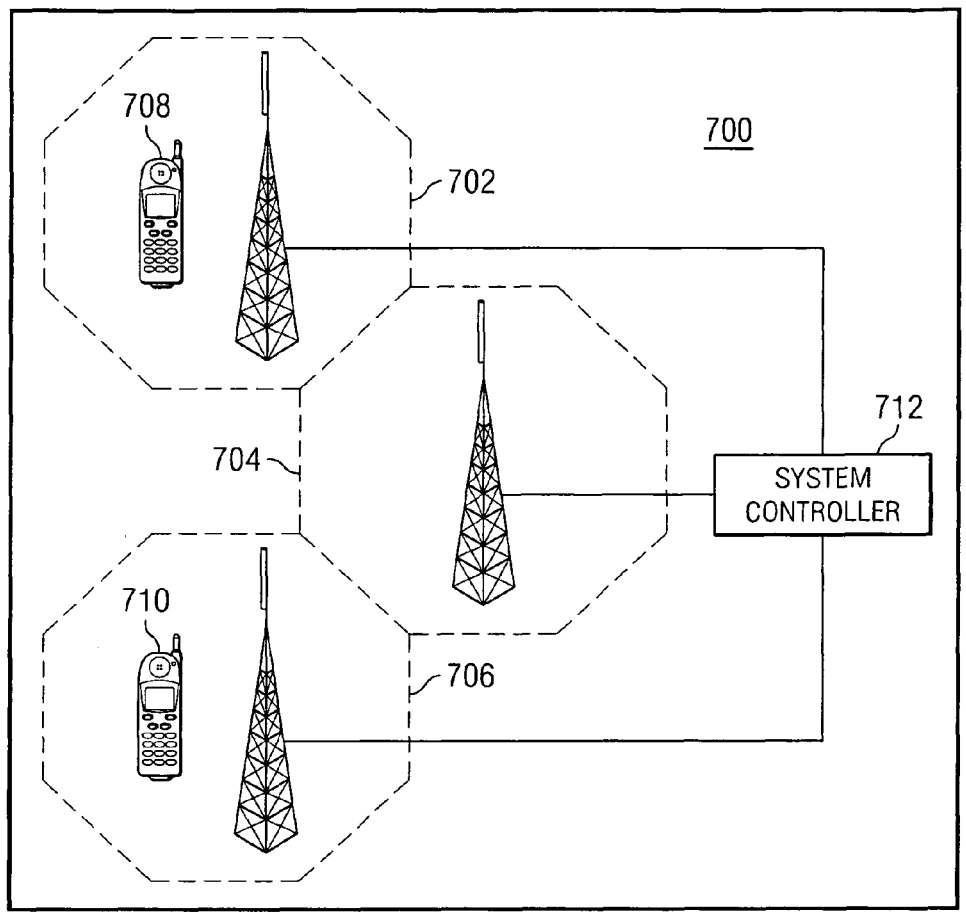
FIG. 7 shows a communication system in accordance with an embodiment of the invention.

In this description, we use an HRPD system to illustrate one embodiment of the broadcast multicast mode of the present invention. Note that the mode is applicable to any wireless standard and is not limited to HRPD systems.

In FIG. 3, there is shown a transmission format for the transmission of broadcast/multicast data that is relevant to HRPD as well as to other broadcast/multicast communication systems. The disclosed approach efficiently combines the signals received from the different sectors/cells in a communication system. In accordance with an embodiment of the invention, whenever identical broadcast/multicast data is being transmitted from different sectors/cells in a system, the present invention inserts a cyclic prefix (CP) to the broadcast/multicast data. The CP can be appended, pre-pended or added to both sides of the data. Any cell/sector specific long code spreading is removed for this portion of the transmission in one embodiment of the invention. Alternatively, when identical broadcast/multicast content is transmitted from different sectors/cells in the communication system, a content-dependent long code spreading can be used to differentiate the data from other contents. In the illustrative format shown in FIG. 3, the CP is added to the front and the back of the traffic data 302, 310, 312 and 320. The format also includes the MAC 304, 314, the Pilot 306, 316, and MAC 308, 318. As shown in FIG. 3, in accordance with one aspect of the invention, the traffic data portions 302, 312 and 320 include CPs that are added to the front and back of the traffic data that does not use long code spreading. By appending one or more CPs to the traffic packets 302, 310 and 320 the communication system can maintain backward compatibility with the current HRPD system, while allowing for efficient combining of the same signals being received from the different sectors/cells in the system.

In accordance with an embodiment of the invention, whenever identical broadcast/multicast data is being transmitted from different sectors/cells in a system, a CP is attached to the broadcast/multicast data, as shown in FIG. 3, the CPs can be pre-pended and appended to the data, or as shown in FIG. 4 the CP 404 can be appended to the data 402 only, or as shown in FIG. 5, the CP 502 can be pre-pended to the data 504. One other thing that is done is to remove any long code spreading during transmission of the CP and traffic data.

Some advantages of using what will be referred to as a CDMA+CP based transmission as shown in FIG. 3 in accordance with an embodiment of the invention is that the CDMA+CP scheme facilitates optimum combining and equalization at the receiver. That is, combining and equalization of the composite long channel from all the sectors transmitting the same content can be done efficiently and with relatively low complexity using a receiver architecture such as that shown in FIG. 6 and which will be discussed further below. The use of the CDMA+CP approach described also provides for backwards compatibility with the current IRPD and other types of broadcast/multicast systems since the transmitters sill employ CDMA transmissions. The cell/sector specific long code spreading can be removed from the transmitter as the additional block(s) of CP has to be added at the transmitter, other than the addition of the CP there is no other change required in the transmitter signaling.

Using the CDMA+CP scheme of the present invention, different types of receivers can be employed since CDMA is used, for example, conventional rake receivers or equalizers can be used. If there is a need for a more advanced receiver that can efficiently combine the identical broadcast/multicast signals from the different cells/sectors, then a fast Fourier transform (FFT)/inverse fast Fourier (IFFT) receiver 600 as shown in FIG. 6 can be also be employed. The FFT/IFFT architecture receiver 600 allows for lower complexity combining and equalization of the long channel response that results from the combined channel across the different sectors/cells, which is made possible by the insertion of the CP. A FFT block 602 performs FFT on the received signal and provides the transformed signal to a frequency domain equalizer 604. Equalization algorithms that can be used include but are not limited to, linear, decision feedback and maximum likelihood as illustrative examples. An inverse FFT (IFFT) then performs IFFT on the normalized signal. Finally, demodulation of the signal is performed by a quadrature phase shift keying (QPSK)/16 quadrature amplitude modulation (QAM) demodulator 608 (QPSK/16 QAM).

Referring now to FIG. 7, there is shown a communication system 700 in accordance with one embodiment of the invention. Communication system 700 can comprise a cellular system including a plurality of cell sites 702-706 that can each broadcast/multicast messages. One or more of the cell sites can be arranged into different sectors in the system. A plurality of cellular telephones 708 and 710 operate within the system 700. The communication system 700 including the cellular telephones 708, 710 employ the CDMA+CP scheme of the present invention allowing for an enhanced broadcast multi-cast mode for HRPD that is backward compatible with existing CDMA systems.

Figure 8:
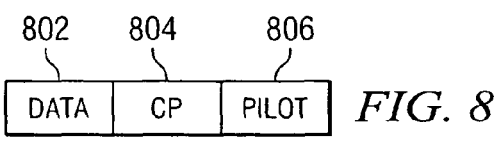
FIG. 8 shows a transmission format in accordance with another embodiment of the invention.

In another embodiment of the invention, pilot symbols are inserted into the data fields for the broadcast/multicast messages. The pilot symbols can be code-domain (CD) or time-domain (TD) multiplexed. The position of the pilot symbols in the code or in the time domain can be arbitrary or optimized based on different criteria. The addition of the pilot symbols can be in addition to the CP previously described or using the pilot symbols alone without using the CP. In FIG. 8, there is shown a data field such as data field 302 previously shown, but in FIG. 8 a pilot 806 is added to the data 802 and CP 804. Pilot 806 can comprise a TD pilot, although shown added to the end of the data field; the TD pilot 806 can also be introduced at the beginning of the data field(s). In the illustrative example shown in FIG. 8, the pilot can be a TD pilot 806 having Np codes, the CP can have Nc, chips, the data field can for example have 400 chips and the entire data field shown in FIG. 8 can be a CDMA modulated data field comprising 400+Nc+Np chips. Since the pilot symbols are inserted in the data field, the pilot is also spread using the content-dependent long spreading code. These pilot symbols allow for simple (one shot) and efficient estimation of the composite broadcast/multicast channel (from multiple sectors).

Figure 9:
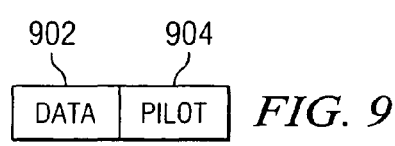
FIG. 9 shows another transmission format in accordance with another embodiment of the invention.
Figure 10:
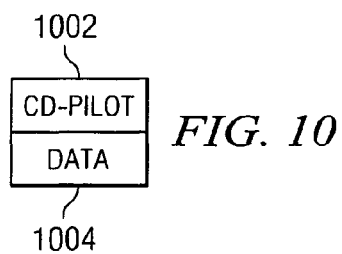
FIG. 10 shows a transmission format in accordance with another embodiment of the invention.

In FIG. 9, there is shown an alternate embodiment in which a TD pilot 904 is added to the data 902 without the use of a CP. In the illustrative example shown in FIG. 9, the data 902 is transmitted without the use of long code spreading. In FIG. 10, another embodiment is shown were a code-division pilot 1002 (example having M codes) is added to the data 1004 (CDMA modulated data having 16-M codes). Using a pilot as discussed facilitates combining and equalization at the receivers that receive the broadcast or multicast transmissions sent out by a communication system. Combining and equalization of the composite long channel from all the cells/sectors can be accomplished efficiently using the previously discussed FFT/IFFT receiver architecture or other receiver architectures. When a pilot signal is added to the data as discussed, the pilot chips are known and can be utilized to remove the edge effects during equalization by the receiver(s).

Figure 11:
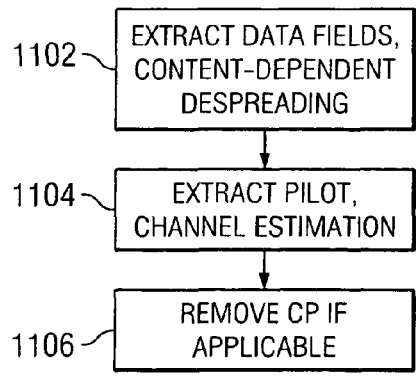
FIG. 11 shows a flowchart highlighting the reception of a broadcast/multicast transmission in accordance with an embodiment of the invention.

In FIG. 11 there is shown a flowchart highlighting how a broadcast/multicast transmission is received. In 1102, the data fields are extracted from the rest of the transmitted packet. In 1104 the pilot is extracted from the data and channel estimation is performed. In 1106, the CP is removed if used in the transmission of the data field.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. The concept of CDMA+CP transmission with content dependent spreading for broadcast/multicast can be applied in other systems besides the 3GPP High Speed Downlink Packet Access (HSDPA) system that was discussed.

What is claimed is:

1. A method, comprising:
 receiving a broadcast/multicast transmission;
 performing fast fourier transformation (FFT) on a signal within the broadcast/multicast transmission;
 normalizing the transformed signal;
 performing inverse fast fourier transformation (IFFT) on the normalized transformed signal; and
 demodulating the inverse fast fourier transformed normalized signal.

2. The method of claim 1, wherein the demodulation of the inverse fast fourier transformed normalized signal is performed by a quadrature phase shift keying (QPSK)/16 quadrature amplitude modulation.

3. The method of claim 1, further including:
 extracting data fields from the demodulated signal;
 extracting a pilot signal from the data fields;
 performing channel estimation using the extracted pilot signal; and
 removing any cyclic prefix (CP) associated with the data fields.

* * * * *